US008943202B2

(12) United States Patent
Chevillat

(10) Patent No.: US 8,943,202 B2
(45) Date of Patent: Jan. 27, 2015

(54) NETWORK RESOURCE ACCESS USING SOCIAL NETWORKS

(75) Inventor: Jérôme Chevillat, Neuchâtel (CH)

(73) Assignee: Cisco Technology, Inc., San Jose, CA (US)

( * ) Notice: Subject to any disclaimer, the term of this patent is extended or adjusted under 35 U.S.C. 154(b) by 146 days.

(21) Appl. No.: 13/349,252

(22) Filed: Jan. 12, 2012

(65) Prior Publication Data

US 2013/0185426 A1  Jul. 18, 2013

(51) Int. Cl.
*G06F 15/16* (2006.01)

(52) U.S. Cl.
USPC .......................................................... 709/225

(58) Field of Classification Search
USPC .......................................................... 709/225
See application file for complete search history.

(56) References Cited

U.S. PATENT DOCUMENTS

| | | | | |
|---|---|---|---|---|
| 5,787,427 | A * | 7/1998 | Benantar et al. ........................ 1/1 |
| 5,838,907 | A * | 11/1998 | Hansen ............................ 709/220 |
| 8,296,763 | B1 * | 10/2012 | Peercy et al. ......................... 718/1 |
| 8,359,637 | B2 * | 1/2013 | Yau et al. ............................. 726/4 |
| 8,479,108 | B2 * | 7/2013 | Yuen et al. ........................ 715/762 |
| 2008/0270038 | A1 * | 10/2008 | Partovi et al. ..................... 702/19 |
| 2008/0294607 | A1 * | 11/2008 | Partovi et al. ...................... 707/3 |
| 2009/0049014 | A1 * | 2/2009 | Steinberg ............................ 707/3 |
| 2009/0254980 | A1 * | 10/2009 | Kanaparti ........................... 726/4 |
| 2010/0049788 | A1 * | 2/2010 | Bandaru et al. ................. 709/203 |
| 2011/0258303 | A1 * | 10/2011 | Nath et al. ....................... 709/223 |
| 2011/0307551 | A1 * | 12/2011 | Danezis et al. ................. 709/204 |
| 2012/0110640 | A1 * | 5/2012 | Donelson et al. .................. 726/3 |
| 2012/0151058 | A1 * | 6/2012 | Lee ................................. 709/225 |
| 2012/0192258 | A1 * | 7/2012 | Spencer et al. ..................... 726/7 |
| 2012/0233666 | A1 * | 9/2012 | Gu ..................................... 726/4 |
| 2013/0125226 | A1 * | 5/2013 | Shah et al. ......................... 726/7 |

FOREIGN PATENT DOCUMENTS

WO    WO 2011006231 A1 *  1/2011

OTHER PUBLICATIONS

Marino Miculan and Caterina Urban, Formal Analysis of Facebook Connect Single Sign-On Authentication Protocol, SOFSEM 2011: 37th International Conference on Current Trends in Theory and Practice of Computer Science, Proceedings of the Student Research Forum, 99, 116 (Jan. 22, 2011).*

Under the covers of OAuth 2.0 at Facebook, May 11, 2010.*

(Continued)

*Primary Examiner* — Douglas Blair

(74) *Attorney, Agent, or Firm* — Parker Ibrahim & Berg LLC; James M. Behmke; Kenneth J. Heywood

(57) ABSTRACT

A network controller is enabled to control a network that is administered by a network administrator. The network controller provides the network administrator with an option to register an association with a social network from a plurality of available social networks. The network controller identifies a social network selected by the network administrator. The network controller receives, from the social network, a user identification associated with an account the network administrator in the first social network. The network controller receives from the network administrator configuration parameters for resources in the network. Based on the configuration parameters received from the network administrator, the network controller configures access to resources in the network.

22 Claims, 9 Drawing Sheets

(56) References Cited

OTHER PUBLICATIONS

OAuth, Mar. 29, 2013.*

Eran Hammer, "Introducing OAuth 2.0", May 15, 2010, hueniverse blog on wordpress.com.*

Alex Williams, "Cisco Meraki Launches 'Presence,' With Facebook Account Log-in to Wireless Networks," May 7, 2013, http://techcrunch.com/2013/05/07/cisco- meraki-launches-presence-with-facebook-account-log-in-to-wireless-networks!, downloaded May 28, 2013.

API—Facebook Developers (dated Dec. 23, 2011), https://web.archive.org/web/20111223110903/http://developers.facebook.com/docs/reference/php/facebook-api/, downloaded Jan. 29, 2014, 6 pages.

GITKit Integration Guide—gitkit-java-client-library (updated Oct. 17, 2011), https://code.google.com/p/gitkit-java-client-library/wiki/GITKitIntegrationGuide, downloaded Jan. 29, 2014, 5 pages.

\* cited by examiner

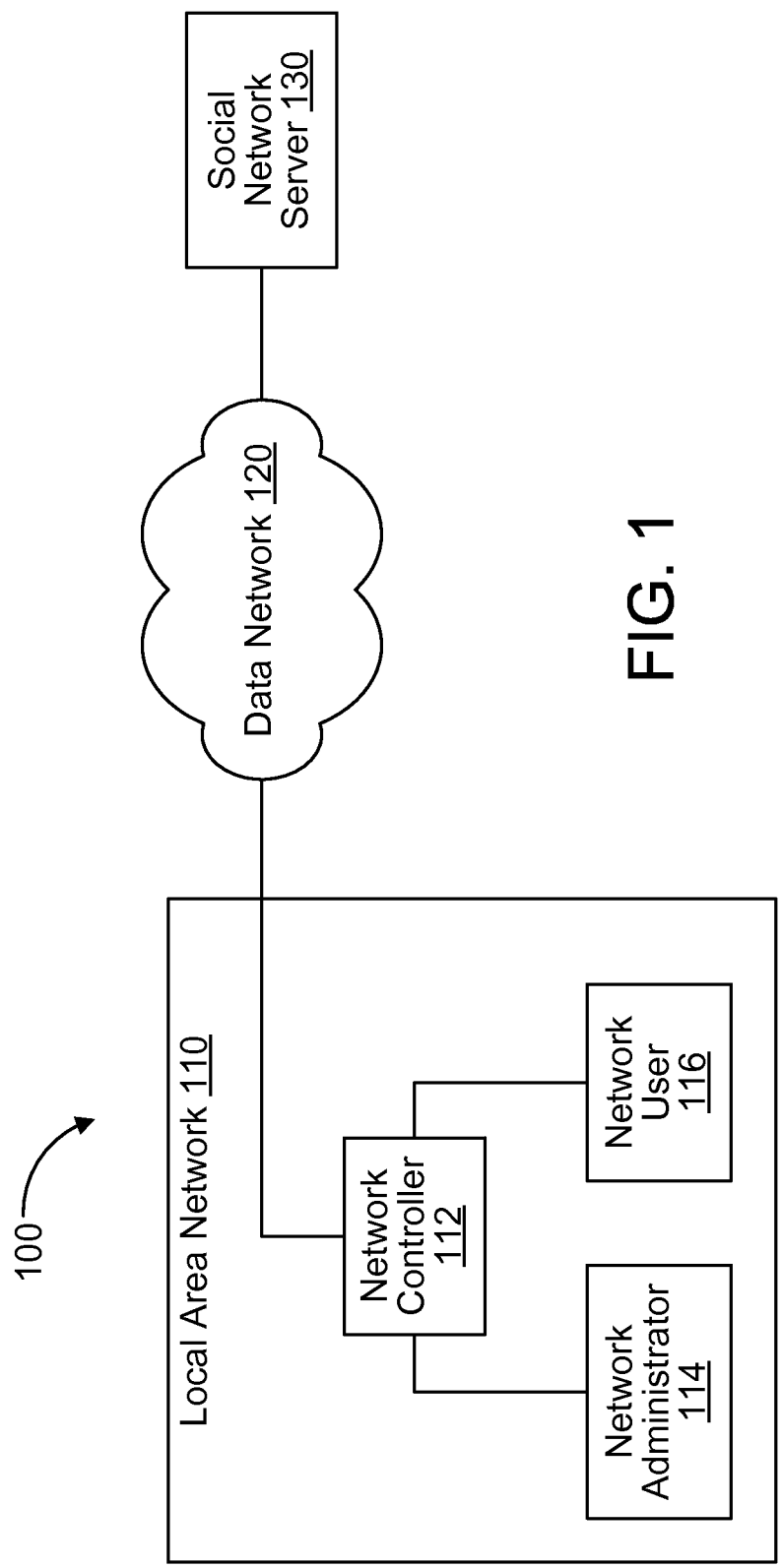

410

| Social Network | User ID |
|---|---|
| Social Network A | *john.doe* |
| Social Network B | 9876543210 |

| Resource | Social Network | Group |
|---|---|---|
| Outbound network | Social Network A | All |
| Local network | Social Network B | csco |
| Printer | Social Network A | Family, Friends |
| NAS | Social Network A | Family, Friends |
| ... | | |

FIG. 4B

| Social Network | User ID | In Group | MAC Address | Valid Until |
|---|---|---|---|---|
| Social Network A | id_on_A | Friends, Football | 01:23:45:67:89:ab | 2011-10-08 13:00 |
| Social Network B | id_on_B | csco | ab:cd:ef:12:23:34 | 2011-10-09 13:00 |

FIG. 4C

NETWORK RESOURCE ACCESS USING SOCIAL NETWORKS

TECHNICAL FIELD

The following disclosure relates generally to managing access to network resources using information from social networks.

BACKGROUND

Network administrators sometimes allow different users different levels of access to network resources. The access granted to a user may be based on some unique information associated with the user, e.g., using a log in and password combination or by checking the physical address associated with a user device. It may be efficient for the network administrator to use information from social networks to grant and manage access to the network resources.

BRIEF DESCRIPTION OF THE FIGURES

FIG. 1 illustrates an example of a system that may be used to manage access to a physical network using social graph information from a social network.

FIGS. 4A-4C are illustrations of exemplary tables implemented in a network controller for managing access to a network using information associated with social networking services.

DESCRIPTION OF EXAMPLE EMBODIMENTS

Overview

Figure 2A:
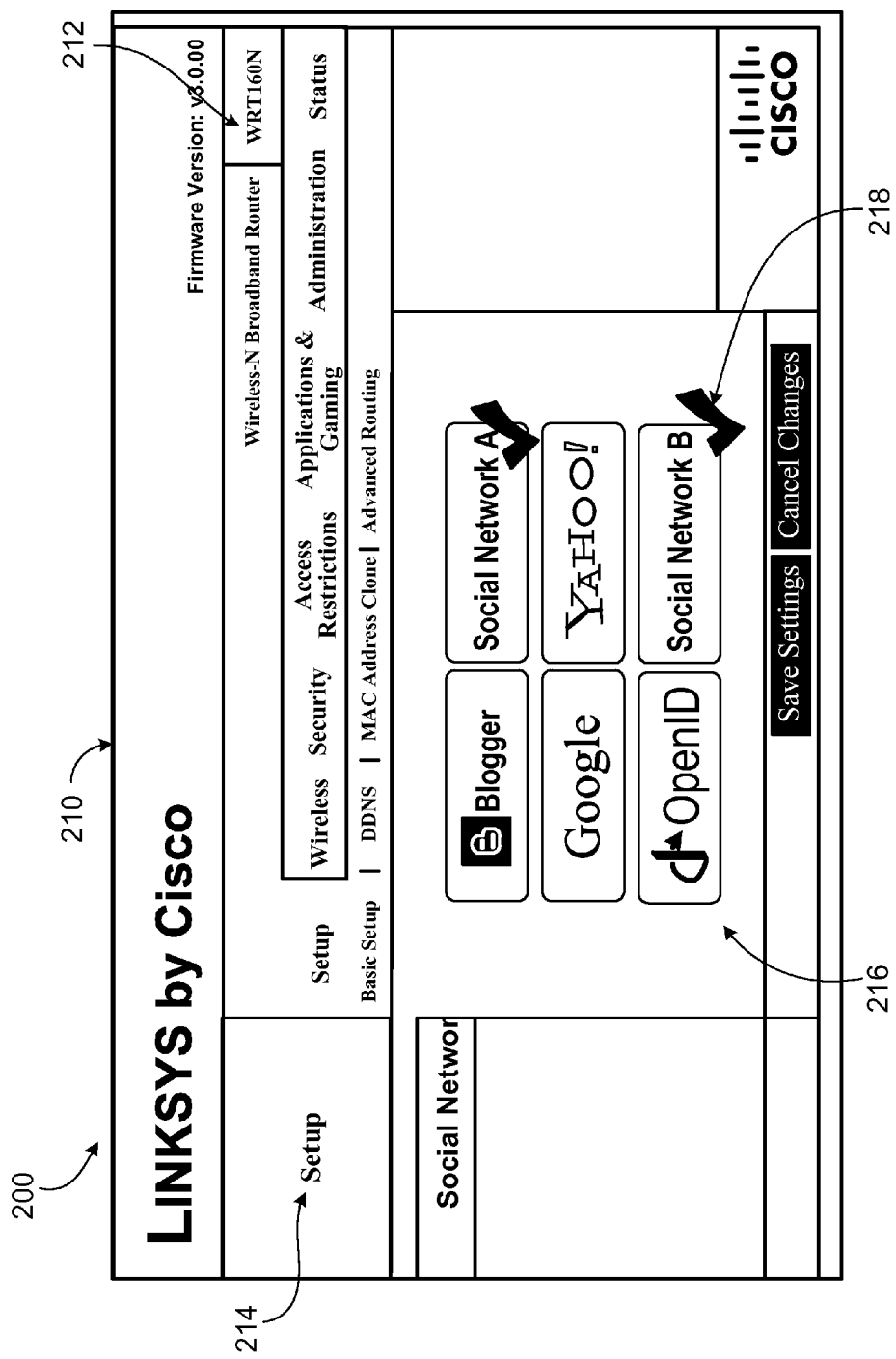
FIGS. 2A-2B are illustrations of an exemplary graphical user interface (GUI) for a network controller that enables configuring access to a network using social networking services.

In a general aspect, a method for administering access to a network is implemented by enabling a network controller to control a first network that is administered by a network administrator. The network controller receives information on a first social network associated with the network administrator. The network controller establishes a communications session with the first social network. The network controller receives, from the first social network, a first user identification associated with the network administrator in the first social network. The network controller receives from the network administrator, configuration parameters for resources in the first network. Based on the configuration parameters received from the network administrator, the network controller configures access to resources in the first network.

The details of one or more aspects of the subject matter described in this specification are set forth in the accompanying drawings and the description below. Other potential features and aspects of the subject matter will become apparent from the description, the drawings, and the claims.

Detailed Description of Example Embodiments

The wire line and wireless networks of today usually implement some form of access control, which helps to protect users and resources on the networks from unauthorized user by outsiders who may otherwise gain access to the networks, and also ensure that the networks do not get strained from too many users at the same time. In many cases, such access control can provide tiered access in which a user may be permitted access to some resources on the network, such as using wireless bandwidth to surf the Internet, but be blocked from accessing other resources, e.g., not permitted to use a printer that is connected to the network.

Access control to a network may been configured and managed by network administrators. For example, the network administrator may use a web-based graphical user interface (GUI) to configure routers and switches on the network to allow or block access to the network resources. In order to grant a user access to some network resource, the network administrator may obtain some unique identifying information of the computing device of the user, e.g., the physical (MAC) address of the network adapter coupled to the computing device, and include the identifying information in a list of computing device addresses that are allowed access to the network resources. When the configuration information is thus updated for routers and switches in the network, the user is able to access the network resource using the machine whose physical address was registered by the network administrator as described above. Users with computing devices whose physical addresses are not registered by the network administrator, will not be able to access the network resource.

In another approach, in order to access the network resources in a network, a user may be required to create a username and password by visiting a registration site provided by the network administrator. The username and password are stored in a database associated with the network. When the user wishes to access the network, the user is required to authenticate him/her by entering the username and password correctly (such that it matches the username and password stored in the database) by visiting an authentication site that is linked to the database. The frequency with which the user is required to be authenticated may depend on the policies enforced in the network.

The various processes of enabling access to a network as described above can be cumbersome or impractical in some cases. For example, if a user wishes to use multiple computing devices, the network administrator will have to register the physical address of each computing device. For a large number of users, the registration process may become unwieldy. On the other hand, a user may find it frustrating to have to enter a user name and password every time the user wants to access some network resource. For a large number of users, maintaining the database also may be expensive.

An alternative method of enabling access to network resources may be by using information from online social networking services, frequently referred to as social networks. In this context, a social network or social networking service is an online, i.e., World Wide Web (WWW) based service, platform, or website that facilitates the creation of social relations among people, who, for example, share interests and/or activities. A social networking service includes a representation of each user (e.g., a profile), the user's social links, and a variety of additional services. Social networking services provide means on their websites for users to interact over the Internet, such as e-mail and instant messaging (IM). Social networking websites allow users to share ideas, activities, events, and interests within their individual social networks. Examples of social networking services include FACEBOOK, TWITTER and LINKEDIN. In the rest of the discussion, the terms "social network" and "social networking service" are used interchangeably to mean the same thing.

A user of a social network creates a social graph that links the user to other users of the social network who are known or connected to the user. In some implementations, the social graph information may be used to grant and manage access to the network resources on a physical network. For example, the network administrator may have an account on a social networking website. The network administrator may use the social graph information associated with his or her account on the social networking website, and allow access to the physical network to users who are present on the network administrator's social graph. To implement fine-grained access to the network resources, the network administrator may create and use different social graphs corresponding to different network resources. Using this approach, the overhead of managing registration information and authenticating users for network access, is transferred from the network administrator to the provider of the social networking service.

FIG. 1 illustrates an example of a system 100 that may be used to manage access to a physical network using social graph information from a social network. The system 100 includes a local area network (LAN) 110 that is connected over a data network 120 to a social network server 130. The LAN 110 includes a network controller 112, a network administrator 114 and a network user 116.

The LAN 110 includes a physical network that is managed by the network administrator 114. Network user 116 is a user who wishes to access the network resources in LAN 110. The network administrator 114 grants or blocks access to network user 116 by configuring the LAN 110 using the network controller 112.

The LAN 110 may be an individual home network that is administered by a resident living in a house. Alternatively, the LAN 110 may be an organizational network such as a network implemented in an office, a university or a government agency or building. The LAN 110 also may be a network in a public location such as in an airport, a shopping mall or a store. In any or all the cases above, the LAN 110 may be either a wired network (e.g., a wired Ethernet network) or a wireless network (e.g., IEEE 802.11 or Wi-Fi network).

The network controller 112 is a machine that is connected to the LAN 110 and configured to manage the LAN 110. The network controller 112 may be a computer, a router, or a suitable combination of a computer and a router. In some implementations, the network controller 112 is provided with antennas that are configured to generate radio frequency (RF) waves to enable implementation of the LAN 110, e.g., antennas coupled to a router that transmit RF waves to create a wireless network associated with the LAN 110. The network controller 112 may be provided with an input/output system, such as a monitor and a keyboard/mouse combination, to enable the network administrator 114 to access and manage the configuration of the LAN 110 using the network controller 112. The network controller 112 may run one or more programs in hardware and/or software that are configured to enable the network administrator 114 to access detailed information on the LAN 110, and to manage the LAN 110. The detailed information on the LAN 110 may include configuration of the LAN 110, current status of the LAN 110, errors if any in the LAN 110 and performance statistics of the LAN 110. The configuration of the LAN 110 includes information on users that are allowed to access one or more features or services in the LAN 110.

The network administrator 114 is an individual or entity who has been granted privileges to manage the LAN 110. In some implementations, the network administrator 114 may be a group of individuals each of whom has privileges to manage the LAN 110. For example, the network administrator 114 may be a house resident who manages an individual home network LAN 110 in his/her house. Alternatively, the network administrator 114 may be information technology (IT) support personnel in an organization such as in an office, a university, or a government agency, or in a public building such in an airport, a shopping mall or a store. In some implementations, the network administrator 114 creates the LAN 110, apart from managing the LAN 110. In some other implementations, the network administrator 114 manages the LAN 110 that was previously implemented by some other entity and/or method. The network administrator 114 manages access of different users to the LAN 110 by configuring access rules for the LAN 110 using the network controller 112. The network administrator 114 configures access rules for the LAN 110 by using social graphs from one or more social networking services, which the network administrator 114 links with the network controller 112.

The network user 116 is an individual who wishes to use the network resources in the LAN 110. In some implementations, the network user 116 may wish to gain access to the network resources in the LAN 110 for the long term, e.g. a resident in a house with the LAN 110, or a new employee in an office with the LAN 110. In some implementations, the network user 116 may wish to gain access to the network resources in the LAN 110 for a short term, e.g., a guest in a house with the LAN 110, or a visitor to an organization with the LAN 110. The network user 116 is able to access the network resources in the LAN 110 when the network administrator 114 configures the LAN 110 to grant access to the network user 116. The resources in the LAN 110 that the network user 116 can access and the duration of access are based on the access configuration of the LAN 110 as specified by the network administrator 114.

The data network 120 connects the network controller 112 to one or more social network servers 130. The data network 120 may include a circuit-switched data network, a packet-switched data network, or any other network able to carry data, for example, Internet Protocol (IP)-based or asynchronous transfer mode (ATM)-based networks, including wired or wireless networks. The data network 120 may be configured to handle web traffic such as hypertext transfer protocol (HTTP) traffic and hypertext markup language (HTML) traffic. The data network 120 may include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The social network server 130 is a server hosting a social networking service. In one implementation, the social network server 130 may be a collection of servers hosting one or more social networking services. In some implementations, the social network server 130 may be a server that is configured to return web pages corresponding to the social networking service that is selected by the network administrator 114 using the network controller 112. The web pages may include links to one or more social graphs that are used by the network administrator 114 for configuring the LAN 110 based on which user 116 may access various network resources in the LAN 110.

Figure 2B:
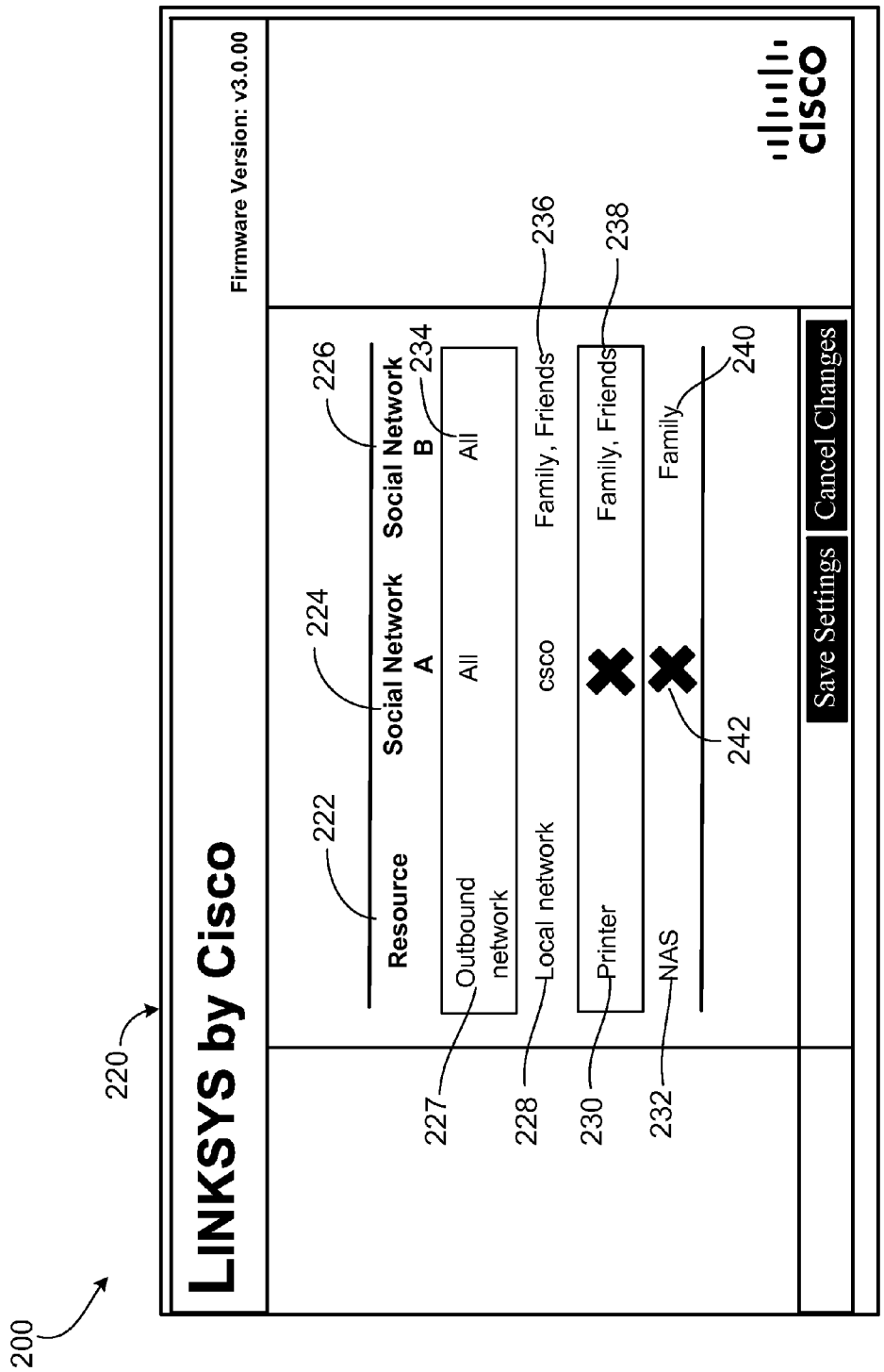

FIGS. 2A-2B are illustrations of an exemplary graphical user interface (GUI) 200 for a network controller that enables configuring access to a network using social networking services. The GUI 200 may be implemented, for example, by the network controller 112 of system 100. The following describes the GUI 200 as being implemented and used by components of the system 100. However, the GUI 200 and the associated network controller also may be implemented and used by other systems or system configurations.

FIG. 2A shows a setup screen 210 of the GUI 200 that is presented to the network administrator 114 when the network administrator 114 uses the network controller 112 to configure the LAN 110. The setup screen 210 includes an identifier 212 for the network controller 112, an indication of the purpose for the setup screen 214, a list 216 representing icons of social networking services that are supported by the network controller 112 and a check mark 218 indicating the social networking services selected by the network administrator 114.

The setup screen 210 is presented, for example, when the network administrator 114 configures the LAN 110 for the first time. The setup screen 210 allows the network administrator 114 to select one or more social networking services that are to be used for managing access by users to the LAN 110. The network administrator 114 can also access the setup screen 210 whenever the network administrator 114 wants to add or remove social networking services that are to be used for managing access to the LAN 110.

The setup screen 210 is displayed, for example, upon the network administrator 114 launching the network controller 112 GUI 200 on a monitor that is coupled to the network controller 112. When displayed, in some implementations, the setup screen 210 presents an identifier 212 for the network controller 112, including a commercial name and model number for the network controller 112. However, in some other implementations, the identifier 212 may not be present, or it may provide information other than a commercial name and model number for the network controller 112. In some implementations, the setup screen 210 indicates a purpose 214 for the setup screen, e.g., that it is for "Setup".

The setup screen 210 presents a list 216 of social networking services that are supported by the network controller 112, i.e., social networking services with whom the network controller 112 can communicate to retrieve information on the respective social graphs that can be used for configuring access to the LAN 110. In some implementations, the list 216 of social networking services are presented as tiles including icons of the supported social networking services. However, in some other implementations, the list 216 may be presented as text or as textual hyperlinks or in any other suitable form.

The network administrator 114 can select one or more of the supported social networking services by selecting the displayed icons corresponding to social networking services, e.g., by clicking on the icons using a mouse and/or keyboard that are coupled to the network controller 112. When the network administrator 114 selects a social networking service, the selection is indicated on the setup screen 210 by the check mark 218. If network administrator 114 selects more than one social networking service, then multiple check marks 218 will be displayed in proximity to the icons representing the selected social networking services. The setup screen 210 provides the option to save the selection to the configuration of the network controller 112, or to cancel the selection.

FIG. 2B shows a second setup screen 220 of the GUI 200 that is presented to the network administrator 114 upon the network administrator 114 selecting one or more social networking services using the setup screen 210. The setup screen 220 includes a table or list that has one or more rows with each row corresponds to a resource 227, 228, 230 or 232 in the LAN 110. For each row, the setup screen 220 includes a column 222 listing a network resource in the LAN 110, and one or more other columns 224 and 226 indicating the level of access 234, 236, 238 or 240 associated with network resource based on the information provided by the respective social networking service, or an indication 240 of denial of access.

The setup screen 220 allows the network administrator 114 to configure the access that is granted to users in the LAN 110 for each network resource in the LAN 110. The network controller 112 may identify the network resources in the LAN 110 and present them to the network administrator 114 in the setup screen 220. For example, the network resources identified by the network controller 112 may be the outbound network 227, local network 228, Printer 230 and network attached storage (NAS) 232, which are presented in the "Resource" column 222.

In addition to the "Resource" column 222, the network controller 112 will present in the setup screen 220 a column corresponding to each social networking service selected by the network administrator 114. For example, if the network administrator 114 selected social network A and social network B using the setup screen 210, then the setup screen 220 will include a column 224 corresponding to social network A and a column 226 corresponding to social network B.

Based upon the social networking services selected by the network administrator using the setup screen 210, the network controller 112 will contact the selected social networking services and obtain from them information on one or more groups that are associated with the account of the network administrator 114 in each of the selected social networking services. In this context, a group is a subset of a social graph of the network administrator 114 in a social networking service. A group includes one or more other users of the social networking service who are connected on the social graph of the network administrator 114, each of whom was added to the group explicitly by the network administrator 114. For example, the network administrator 114 may create or otherwise have a group Family in social network B. Out of all the users who are connected to the network administrator 114 in the social network B, the network administrator may allow users who are also family members to be included in the group Family. Similarly, the network administrator 114 may have in social network B a second group Friends, which includes users whom the network administrator 114 considers as friends. The network administrator 114 may include a user who is in the social graph of network administrator 114 in both the groups Family and Friends, while another user may be included in one group and not the other, while a third user may not be included in either group.

Subsequent to the network controller 112 retrieving information from the social networking services selected by the network administrator 114, including information on the groups of the network administrator 114, the network controller 112 provides the option to the network administrator 114 to configure, using setup screen 220, the access to each resource in LAN 110 based on the groups. For example, based on the options provided, the network administrator 114 may select to allow users who are in groups Family or Friends in social network B, to use the local network 228 in LAN 110, as indicated in the column 226 corresponding to the resource local network 228. Therefore, when a user attempts to access the local network in LAN 110, the user will be allowed access if the network controller 112 determines that the user is included in either of the groups Family or Friends that are associated with the user account of the network administrator 114 in social network B.

The network administrator 114 can configure the access to the same resource independently for different social networking services that are selected. For example, for social network A, the network administrator 114 may allow users who are in group "csco" to use the local network 228, as indicated in the column 224 corresponding to the resource local network 228.

The network controller 112 may provide the option to the network administrator to configure access to different resources independent of one another. For example, the network administrator 114 may select to deny access to any user of the social network A to network resources Printer 230 and NAS 232, as indicated by the icon 242. However, with respect to social network B, the network administrator 114 may allow members of groups Family and Friends to use the Printer 230, while allowing members of group Family to access the NAS 232, as indicated by 238 and 240 respectively. For some network resource, the network administrator 114 may allow access to all users of the selected social networks, irrespective of their inclusion in any group, e.g., the outbound network 237 is accessible by all users, as indicated by 234.

Based on the settings that are configured by the network administrator 114 using the setup screen 220, the network controller 112 checks, when an user requests access to a network resource, whether the user is included in at least one group that is allowed for the resource, or whether the resource is allowed for all users, or whether access to the resource is denied for all users of the social network associated with the requesting user. If the requesting user belongs to at least one group that is allowed for the resource, or if the resource is allowed for all users of the selected social networks, then the network controller 112 grants the requesting user access to the resource. On the other hand, if the configuration specifies that access to the resource be denied for all users who are affiliated with the social network of the requesting user, then the network controller 112 does not allow the requesting user to access the resource.

Figure 3A:
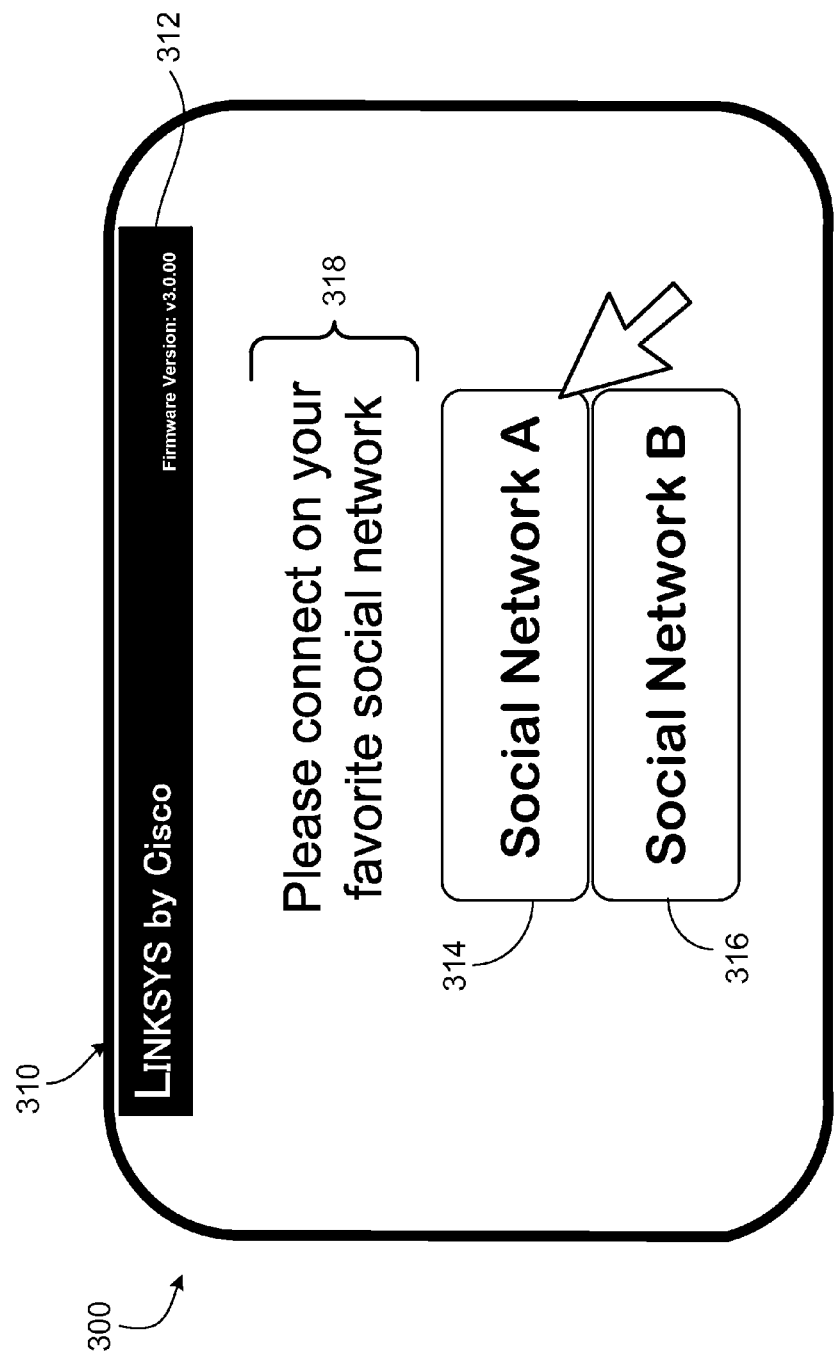
FIGS. 3A-3B are illustrations of an exemplary GUI for a network controller that enables a user to access a network by registering with the network controller using a social networking service.
Figure 3B:
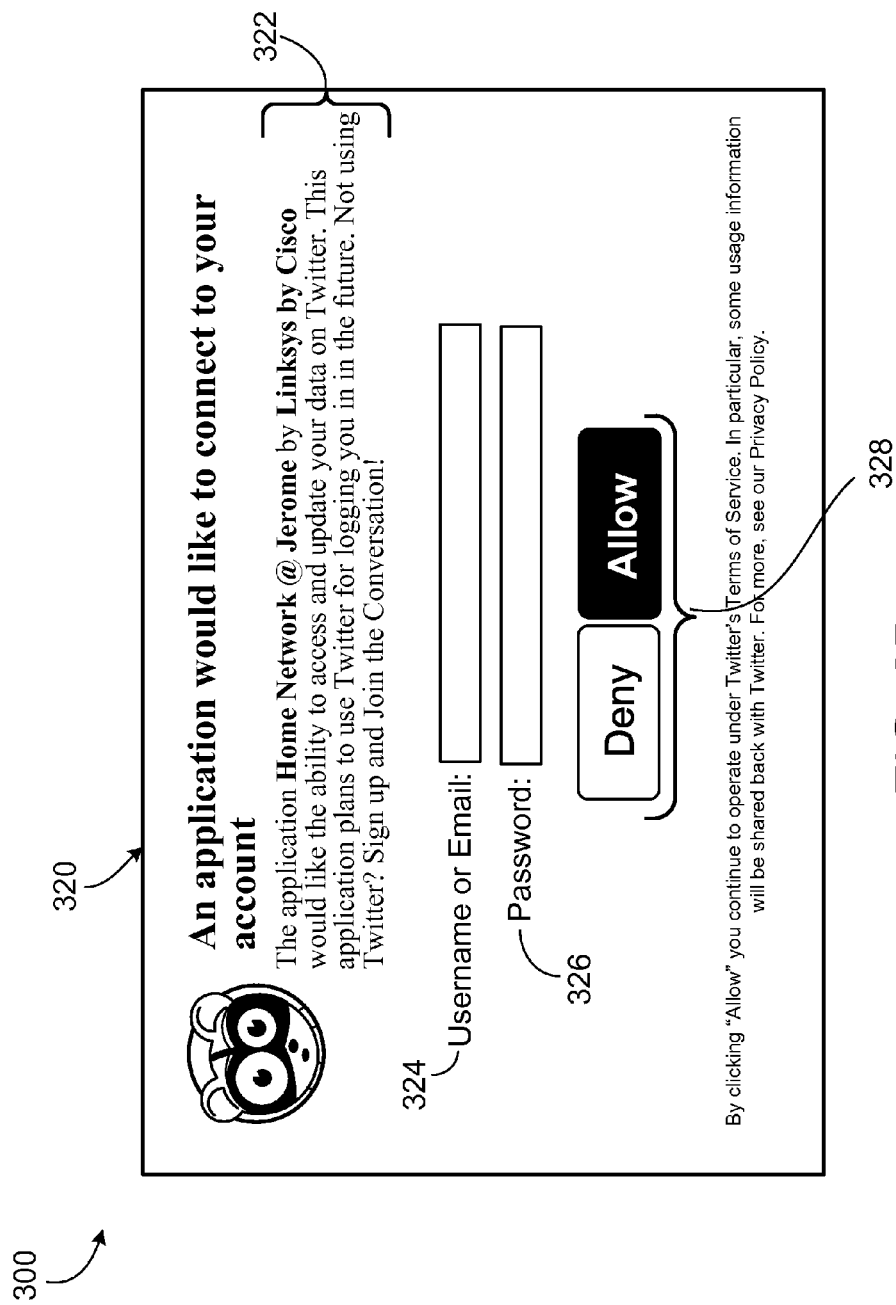

FIGS. 3A-3B are illustrations of an exemplary GUI 300 for a network controller that enables a user to access a network by registering with the network controller using a social networking service. The GUI 300 may be implemented, for example, by the network controller 112 of system 100. The following describes the GUI 300 as being implemented and used by components of the system 100. However, the GUI 300 and the associated network controller also may be implemented and used by other systems or system configurations.

FIG. 3A shows a registration screen 310 of the GUI 300. The registration screen 310 includes an identifier 312 for the device that generated the registration screen 310, and a list including icons 314 and 316 associated with social networks that are supported by the network controller 112. The registration screen 310 also includes information 318 on using the icons.

The registration screen 310 is presented to the network user 116 when the network user 116 attempts to access the network resources in the LAN 110. For example, the LAN 110 may be a wireless LAN, and a computing device of the network user 116 may detect the wireless LAN 110 when within wireless reception range of the LAN 110, and automatically attempt to connect to the wireless LAN 110. The computing device of the network user 116 may successfully establish a connection with the LAN 110, which may trigger a notification on the computing device that it has to be registered on the LAN 110 before it can send/receive data or use any network resource. In some implementations, the notification may be presented every time the network user 116 connects to the LAN 110, or at a frequency configured by the network administrator 114 using the network controller 112, e.g., once per day. In some other implementations, the notification may be presented once, at the first instance the computing device of the network user 116 connects to the LAN 110. In such implementations, once the computing device registers with the network controller 112 the first time, the network controller 112 stores information uniquely associated with the computing device of the network user 116 in its memory such that for every subsequent connection on the LAN 110 from the same computing device, the network controller 112 can verify that the computing device is already registered, e.g., using the physical address of the network adapter coupled to the computing device, and therefore allow the computing device access to the LAN 110.

Once the computing device of the network user 116 establishes a connection on the LAN 110 and a notification is presented on the computing device indicating that it has to register, the network user 116 launches a web browser on the computing device in order to register. In some implementations, when the web browser is launched, the network controller 112 presents the registration screen 310 on the web browser. In some other implementations, the network controller 112 presents the registration screen 310 using an application other than a web browser, e.g., a standalone application that is used for configuring the parameters of the LAN 110. In such implementations, the network controller 112 may also present the setup screens 210 and 220 using the application that is different from a web browser.

The registration screen 310 includes an identifier 312 that displays information on the network controller 112, for example, the brand name and model number of the router that implements the network controller 112. The identifier 312 indicates to the network user 116 that the registration screen 310 is presented by the network controller 112. However, in some implementations, the identifier 312 may not be present, or it may include additional information or it may include information that is different from the information described above.

The registration screen 310 presents a list of icons corresponding to the social networking services that are supported by the network controller 112, and includes information 318 instructing the network user 116 to select one of the social networking services in order to complete the registration. For example, the registration screen 310 presents the icons 314 and 316 corresponding to the social network A and social network B, respectively. The social networking services whose icons are presented on the registration screen 310 are the social networking services that are selected by the network administrator 114 using the setup screen 210.

Based on the instructions provided by the information 318, the network user 116 selects one of the social networking services listed on the registration screen 310. The network user 116 selects a social networking service by selecting the icon representing the corresponding social networking service, e.g., the network user 116 may click on icon 314 to select social network A. The network user 116 selects an icon by clicking on the icon, highlighting the icon, or by using some other suitable means.

In some implementations, the social networking service selected by the network user 116 is a social networking service that includes a user account associated with the network user 116. However, in some other implementations, the network user 116 may not have a user account with any one of the social networking services presented on the registration screen 310. In such implementations, the network user 116 may first create an account with at least one of the social networking services presented on the registration screen 310 using some alternative means, and then return to the registration screen 310 to complete registering with the network controller 112. Alternatively, the network controller 112 may provide the network user 116 with an alternative means to register.

FIG. 3B shows a registration screen 320 of the GUI 300. The registration screen 320 includes information 322 regarding the social networking service selected by the network user 116. The registration screen 320 also includes fields for the network user 116 to enter the username or email 324 and password 326 corresponding to the account of the network user 116 on the selected social networking service, and buttons 328 for the network user 116 to complete or cancel the registration process.

When the network user 116 selects a social networking service from the registration screen 310, the network controller 112 establishes a connection to a server hosting the selected social networking service, e.g., social network server 130. In some implementations, the server hosting the selected social networking service may be a web server that is configured to process and display web pages, and also configured to send information to the network controller 112 included in web pages.

When the connection is established, the server sends the registration screen 320 to the network controller 112. The network controller 112 presents the registration screen 320 using the web browser on the computing device of network user 116. In some implementations, the connection between the network controller 112 and the server hosting the selected social networking service is secure, i.e., the data exchanged between the network controller 112 and the server may be authenticated and/or encrypted using a predetermined standard security protocol that is supported by both the network controller 112 and the server. For example, the network controller 112 and the server may exchange data over the established connection using OPEN AUTHORIZATION version 2.0 (OAUTH2.0) protocol, which enables the network controller 112 and the server to share information without requiring them to know each other's credentials such as username and password. In other implementations, the network controller 112 and the server may exchange information securely using some other security protocol. In yet other implementations, the connection between the network controller 112 and the server may be unsecured such that data is exchanged in the open.

The contents of the registration screen 320 may depend on the social networking service selected by the network user 116. For example, the registration screen 320 as shown in FIG. 3B displays information associated with social network A based on the network user 116 selecting social network A on registration screen 310. However, if the network user 116 selected social network B on registration screen 310, the information displayed on the registration screen 320 would be associated with social network B.

The information 322 indicates to the network user 116 that the network controller 112, or an application associated with the network controller 112, would like to access the account of the network user 116 on the selected social networking service. In some implementations, the information 322 may also provide an option to the network user 116 to create a user account on the selected social networking service if the network user 116 does not have an account, for example, by providing a hyperlink to an account creation web page associated with the selected social networking service.

The registration screen 320 provides a field for the network user 116 to enter the username or email address 324 associated with the user account of the network user 116 on the selected social networking service. The registration screen 320 provides a second field for the network user 116 to enter the password 326 associated with the user account of the network user 116 on the selected social networking service. After entering the username or email address 324 and password 326, the network user 116 gives permission to the social networking service to access the account of the network user 116 and share the information with the network controller 112 by clicking on the Allow button from the buttons 328. Alternatively, the network user 116 may decide not to continue with the process of registration, for example, if the network user 116 does not wish to share the details of his/her account on the selected social networking service. In such a case, the network user 116 may cancel the transaction by selecting the Deny button from the buttons 328.

In the event the network user 116 provides the username or email 324 and password 326 associated with his/her account on the selected social networking service, and clicks the Allow button, the server hosting the selected social networking service accesses the associated account of network user 116 verifies whether the account exists. If the account exists, the server sends to the network controller 112 the user identifier (user ID) associated with the account of the network user 116. The network controller 112 uses the user ID of the network user 116 to verify the relationship between the network user 116 and the network administrator 114, i.e., whether the network user 116 is in the social graph of the network administrator 114 and which groups in the social graph of the network administrator 114 includes the network user 116. The verification of inclusion of the network user 116 in the groups associated with the network administrator 114 helps the network controller 112 determine whether to grant or deny the access requested by the network user 116, based on the access configuration set by the network administrator using the setup screen 220.

FIGS. 4A-4C are illustrations of exemplary tables 410, 420 and 440 implemented in a network controller for managing access to a network using information associated with social networking services. The tables 410, 420 and 440 may be implemented, for example, by the network controller 112 of system 100. The following describes the tables 410, 420 and 440 as being implemented and used by components of the system 100. However, the tables 410, 420 and 440 and the associated network controller also may be implemented and used by other systems or system configurations.

FIG. 4A shows a table 410 that lists social networking services supported by the network controller 112 and selected by the network administrator 114. The table 410 includes a column 412 listing the selected social networking services. The table 410 also includes a column 414 listing the user identifier (User ID) of the network administrator 114 in the supported social networking services. Each row 416, 418, in the table includes the tuple <social networking service, user ID> for a social networking service selected by the network administrator 114. For example, the network administrator 114 may select social networking services social network A and social network B using the setup screen 210, and the corresponding user IDs of the network administrator 114 may be john.doe and 9876543210, respectively. Therefore, rows 416 and 418 of table 412 will include the tuples <social network A, john.doe> and <social network B, 9876543210>, respectively.

The table 410 may be implemented in memory associated with the network controller 112, e.g., in a hard drive or long term flash memory coupled to a router implementing the network controller 112. The network controller 112 may populate the table 410 when the network administrator 114 registers with the network controller 112. The information in the table 410 is updated by the network controller 112 whenever the network administrator 114 updates the selection of social networking services, and/or updates the information associated with the selected social networking services. For example, the table 410 is updated whenever the network administrator 114 adds a new social networking service that is supported by the network controller 112 using the setup screen 210. The table 410 is also updated whenever the network administrator 114 removes a new social networking service that was previously selected. The table 410 is also updated whenever the network administrator 114 changes the user ID of the account associated with a selected social networking service, e.g., the network administrator 114 may remove a replace a supported user account with a different user account and therefore the user ID in column 414 for the corresponding row of table 410 will change.

The network controller 112 uses the information in table 410 to obtain the social graph information associated with the network administrator 114 in a selected social networking service, initially when the network administrator 114 selects a social networking service using the setup screen 210. The network controller 112 also uses the information in table 410 to periodically refresh the social graph information associated with the network administrator 114 in the selected social networking services. The social graph information associated with the network administrator 114 in a social networking service may change with time, for example, as the network administrator 114 creates or removes social circles from the social graph.

FIG. 4B shows a table 420 that lists the level of access to the network resources in the LAN 110 that is allowed to an user based on the information provided by the social networking services supported by the network controller 112 and selected by the network administrator 114.

The table 420 includes rows 428, 430, 432 and 434. Associated with each row in the table 420 are columns 422, 424 and 426 listing, respectively, a supported network resource in the LAN 110, a social networking service selected for the respective network resource, and the groups in the selected social networking service that are allowed to access the respective resource in column 422. For example, row 432 in the table 420 lists Printer in the resource column 422, social network A in the social network column 424, and Family and Friends in the group column 426. Therefore, row 432 indicates that users who are included in groups Family and Friends in the social graph of the network administrator 114 in the social network A are allowed to access the network resource Printer in the LAN 110.

The table 420 may be implemented in memory associated with the network controller 112, e.g., in a hard drive or long term flash memory coupled to a router implementing the network controller 112. The network controller 112 may populate the table 420 using the information provided by the network administrator 114 when the network administrator 114 configures access to the network resources using the setup screen 220. The network controller 112 may update the table 420 periodically or at any time when the network administrator 114 re-configures access to the network resources using the setup screen 220.

The network controller 112 uses the information in table 420 to grant or deny access to various network resources when a network user 116 registers with the network controller 112 and requests access to one or more network resources. When the network user 116 selects a supported social networking service and provides his/her credentials corresponding to the selected social networking service, for example, using the registration screens 310 and 320, the server associated with the selected social networking service verifies the user account for the network user 116 and sends to the network controller 112 the user identifier (user ID) associated with the user account of the network user 116. The network controller 112 uses the social graph of network administrator 114 in the selected social networking service and the user ID of the network user 116 to determine which groups in the respective social graph includes the network user 116. In some implementations, the network controller 112 sends the user ID of the network user 116 to an application programming interface (API) associated with the selected social networking service to verify the existence of a relationship between the network user 116 and the network controller 114. The API returns to the network controller 112 verification whether a relationship exists and information on the groups in the social graph of the network administrator 114 that include the network user 116.

The network controller 112 checks using the table 420 whether the social network selected by the network user 116 is allowed for the particular network resource to which the network user 116 is requesting access, based on the information in columns 422 and 424 for the row in the table 420 corresponding to the particular network resource. If the social network selected by the network user 116 is allowed, then the network controller 112 checks whether the groups that include the network user 116, as returned in the information from the API, are allowed to access the network resource, based on the information in column 426 for the row in the table 420 corresponding to the particular network resource. If at least one of the groups that include the network user 116 is included in the column 426 for the row in the table 420 corresponding to the particular network resource, then the network controller 112 grants access to the network user 116 to use the particular network resource. In addition, the network controller 112 stores information associated with the network user 116 in a table in memory. However, if the social network selected by the network user 116 is not included in the column 424, or if any of the groups that include the network user 116 is not included in the column 426 for the row in the table 420 corresponding to the particular network resource, then the network controller 112 denies access to the network user 116.

FIG. 4C shows a table 440 that lists information on network users granted access to the network resources in the LAN 110. The table 420 includes rows 452 and 454 that provide details on user IDs corresponding to network users who have been granted access. Corresponding to each row, columns 442, 444, 446, 448 and 450 present information on, respectively, the corresponding social networking service, the user ID in the social networking service, the groups in the social graph of network administrator 114 that include the user ID, the physical or Medium Access Control (MAC) address of the computing device used by the network user, and a date/time until which the access is allowed. For example, row 452 in table 440 lists social network A in the social network column 442, id_on_A in the user ID column 444, Friends and Football in the group column 446, 01:23:45:67:89:ab in the MAC address column 448 and date/time 2011-10-08 13:00 in the valid until column 450. Therefore, row 452 indicates that a network user with user ID id_on_A in social network A is included in groups Friends and Football in the social graph of the network administrator 114 in social network A; hence the particular network user is allowed to access the network resources in the LAN 110 that are allowed for groups Friends and Football corresponding to the social network A; the particular network user may access the access the network resources in the LAN 110 from a computing device with MAC address 01:23:45:67:89:ab, and the access is allowed until 1300 hours on 2011-10-08.

The table 440 may be implemented in memory associated with the network controller 112, e.g., in a hard drive or long term flash memory coupled to a router implementing the network controller 112. The network controller 112 populates the table 440 using the information provided by the server sand the APIs associated with the social networking services selected by the network administrator 114. The user ID is provided by a server when the network user 116 registers using registration screen 320. The API provides information on the groups that include the network user 116 when the network controller 112 sends the user ID of the network user 116 to the API to verify the existence of a relationship between the network user 116 and the network administrator 114, and to find out the groups that include the network user 116. The information on the social network is obtained by the network controller 112 when the network user 116 selects a social network using the registration screen 310. The MAC address of the computing device associated with the network user 116 may be obtained by the network controller from the initial access request message that is sent by the network user 116 when connecting to the LAN 110. The valid until date and time may be computed by the network controller 112 using an algorithm that is implemented in the network controller 112. Alternatively, the valid until date and time may be computed based on configuration information provided by the network administrator 114.

Whenever a network user 116 connects to the LAN 110 and attempts to use one or more network resources, the network controller 112 checks the table 440 to determine whether the particular network user 116 is granted access to the network resources. The check may be performed by the network controller 112 using, for example, the MAC address of the computing device using which the network user 116 connects to the LAN 110. The network controller 112 may also check whether the validity period of the access, if previously granted, has expired by checking the valid until column in the row corresponding to the MAC address. If the access is still valid for the particular computing device, the network controller 112 may check which resources are allowed for the social networking service and the groups associated with the network user 116 based on the social networking service and group information in the row corresponding to the MAC address.

The network controller 112 may periodically check the table 440 and delete row entries whose valid until date and time are expired. For each row in the table 440, the network controller 112 also may periodically query the corresponding social networking service through its API to refresh the information on the groups in the social graph of the network administrator 114 that include the user ID associated with the row. The frequency with which the network controller 112 queries the social networking service may be based on a predetermined period.

Figure 5:
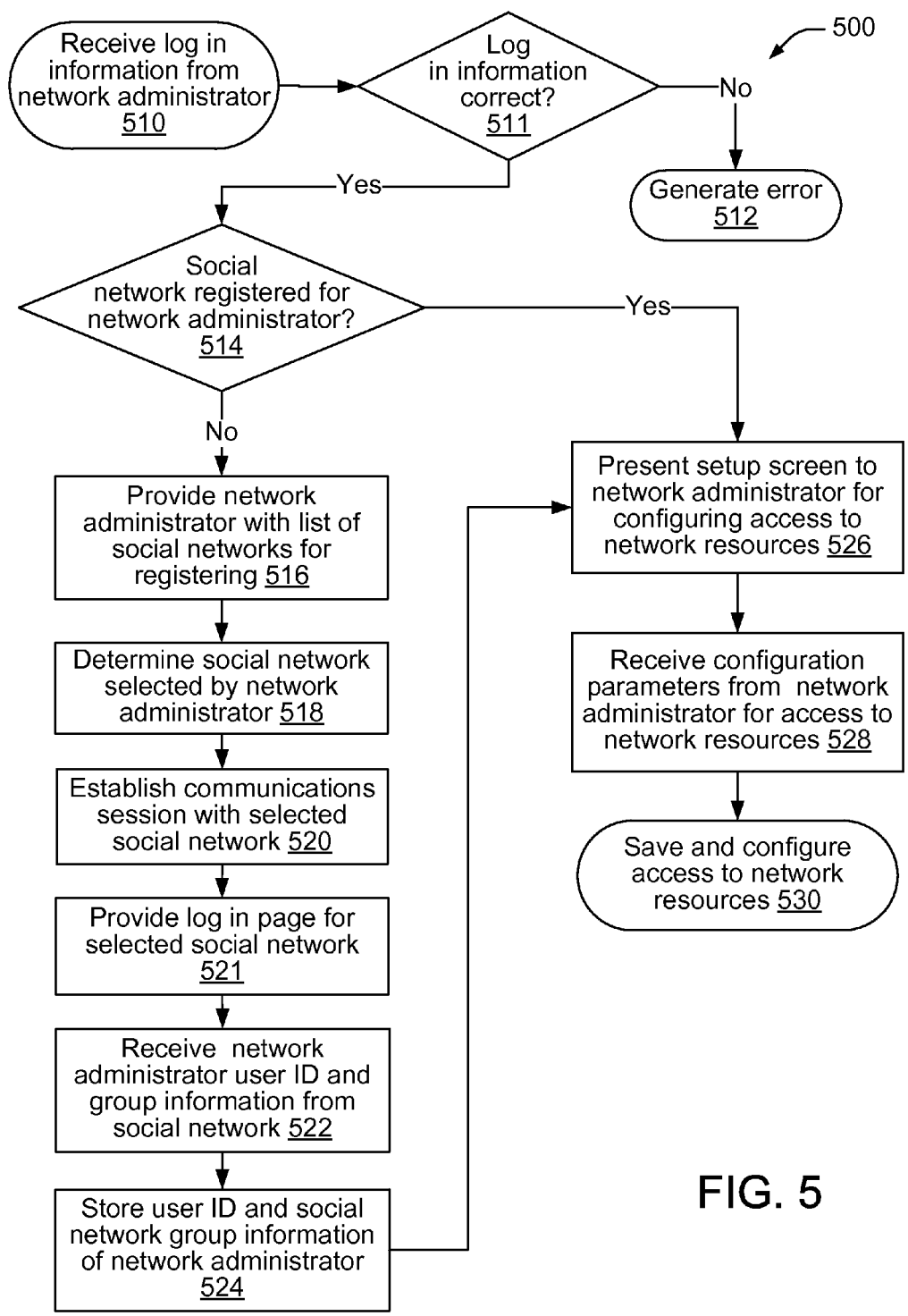
FIG. 5 is a flow chart illustrating an example of a process for configuring access to network resources in a network using social networking information.

FIG. 5 is a flow chart illustrating an example of a process 500 for configuring access to network resources in a network using social networking information. The process 500 may be performed by a network controller that configures access to one or more network resources in a network managed by the network controller, based on information provided by a network administrator. For example, the process 500 may be performed by the network controller 112 when the network administrator 114 configures the access to resources in the LAN 110 using the setup screens 210 and 220. The following describes the process 500 as being performed by components of the system 100. However, the process 500 may be performed by other systems or system configurations.

The process 500 is executed when the network controller receives log in information from the network administrator (510). For example, the network administrator 114 may enter, using a monitor and keyboard/mouse that are coupled to the router implementing the network controller 112, the username and password corresponding to the account of the network administrator associated with the network controller 112. The network administrator 114 enters the username and password in order to access the setup application of the network controller 112 and to configure the access to the LAN 110.

Upon receiving the log in information from the network administrator, the network controller checks whether the log in information is correct (511). For example, the network controller 112 may compare the username and password entered by the network administrator 114 with the username and password corresponding to the account of the network administrator that is saved in memory of the network controller 112.

If the comparison returns a mismatch between either of the username and password entered by the network administrator 114 and the information in the memory of the network controller 112, the network controller generates an error (512). For example, the network controller 112 may display an error message on the monitor that is coupled to the network controller 112. In some implementations, the network controller 112 may provide an option to the network administrator 114 to re-enter the log in information at that time. In some other implementations, the network controller 112 may lock access to the configuration information of the LAN 110 for a predetermined period of time, and instruct the network administrator 114 to attempt again after the lock out period has expired.

If the comparison returns a match between the log in information entered by the network administrator 114 and the credentials stored in the memory of the network controller 112, the network controller checks whether at least one social networking service is registered for the network administrator (514). The network controller 112 may determine that the network administrator 114 has previously registered and configured one or more social networking services. Based on such a determination, the network controller presents a setup screen to the network administrator to allow the network administrator to configure access to the network resources (526).

On the other hand, the network controller 112 may determine that the network administrator 114 has not yet registered and configured any social networking service. This may be the case, for example, when the network administrator 114 is logging in to the network controller 112 for the first time. In such an event, the network controller provides the network administrator with a list of social networks for registering (516). For example, the network controller 112 may present the setup screen 210 that displays icons corresponding to social networking services supported by the network controller 112.

The network administrator 114 selects a social networking service from the setup screen 210. Based on the selections made by the network administrator, the network controller determines the social network selected by the network administrator (518). The network administrator 114 may select multiple social networking services from the setup screen 210. Accordingly, the network controller 112 may determine the multiple social networks selected by the network administrator. For each social network selected by the network administrator, the network controller establishes a communications session with the selected social network (520). For example, the network controller 112 may establish a connection with the social network server 130 that hosts a social networking service selected by the network administrator 114. The network controller 112 establishes a separate connection with each server that hosts a different social networking service selected by the network administrator 114. In some implementations, one or more of the connections may be secure connections, for example, using the OAUTH2.0 protocol, while in some other implementations some or all of the connections may be unsecured connections.

Based on the connection established with a server hosting a selected social networking service, the network controller receives a log in page from the server and presents the log in page for the selected social network on the monitor coupled to the network controller (521). For example, the network controller 112 may present a log in page with an interface that is similar to the registration screen 320. The log in page may include information indicating to the network administrator 114 that the network controller 112, or an application associated with the network controller 112, would like to access the account of the network administrator 114 on the selected social networking service. In some implementations, the information may also provide an option to the network administrator 114 to create a user account on the selected social networking service if the network administrator 114 does not have an account, for example, by providing a hyperlink to an account creation web page of the selected social networking service.

Similar to the registration screen 320, the log in page that is presented to the network administrator 114 may provide a field for the network administrator 114 to enter the username or email address associated with the user account of the network administrator 114 on the selected social networking service. The log in page may also provide a field for the network administrator 114 to enter the password associated with the user account of the network administrator 114 on the selected social networking service. After entering the username or email address and password, the network administrator 114 gives permission to the social networking service to access the account of the network administrator 114 and share the information with the network controller 112 by selecting an Allow button or some other suitable interactive item provided on the log in page. The server hosting the selected social networking service accesses the associated account of network administrator 114 and verifies whether the account exists. If the account exists, the server sends to the network controller 112 information related to the user account of the network administrator 114.

The network controller receives a user identifier (user ID) and information on groups associated with the account of the network administrator, from the server hosting the selected social network (522). For example, the connection between the network controller 112 and the server hosting the selected social networking service may be established using an API provided by the selected social networking service. The API provides to the network controller 112 the user ID of the account associated with the network administrator 114. The API may also provide to the network controller 112 information on the groups that are associated with the user account of the network administrator 114 on the social networking service.

The network controller stores the user ID and group information associated with the account of the network administrator (524). For example, the network controller 112 may store the user ID and the information on the groups that are provided by the API in a hard drive or long-term flash memory coupled to a router implementing the network controller 112. The network controller 112 may store the information in a table similar to the table 410.

Using the information provided by the API, the network controller presents a setup screen to the network administrator to allow the network administrator to configure access to the network resources (526). For example, the network controller 112 may present a setup screen similar to the setup screen 320. The setup screen includes a listing of the network resources in the LAN 110. For each network resource, the setup screen includes a field to specify which selected social networks are enabled to access the respective resource, and another field to specify the identifiers of the groups in the selected social networks that are allowed to access the respective resource.

From the setup screen provided to the network administrator, the network controller receives configuration parameters input by the network administrator for configuring access to the network resources (528). For example, the network administrator 114 may configure, using the setup screen similar to the setup screen 320, the network resources in the LAN 110 and specify which social networks and corresponding groups are allowed to access each network resource.

The network controller saves the configuration information and configures the access to the network resources using the configuration information input by the network administrator (530). For example, when the network administrator 114 opts to save the settings entered through the setup screen 320, the network controller 112 saves the configuration information the hard drive or flash memory coupled to the network controller 112. The network controller 112 may save the configuration information in the table 420. For the first time the network administrator 114 enters configuration information for access to the network resources, the network controller 112 creates and populates the table 420. For every subsequent update to the configuration information for access to the network resources, the network controller 112 updates the table 420. When a network user 116 requests access to a network resource, the network controller 112 checks which social networks and groups are allowed to access the requested network resource, and allows or denies the request of the network user 116 based on whether the social network And groups of the network user 116 are in the allowed lists for the requested network resource.

Figure 6:
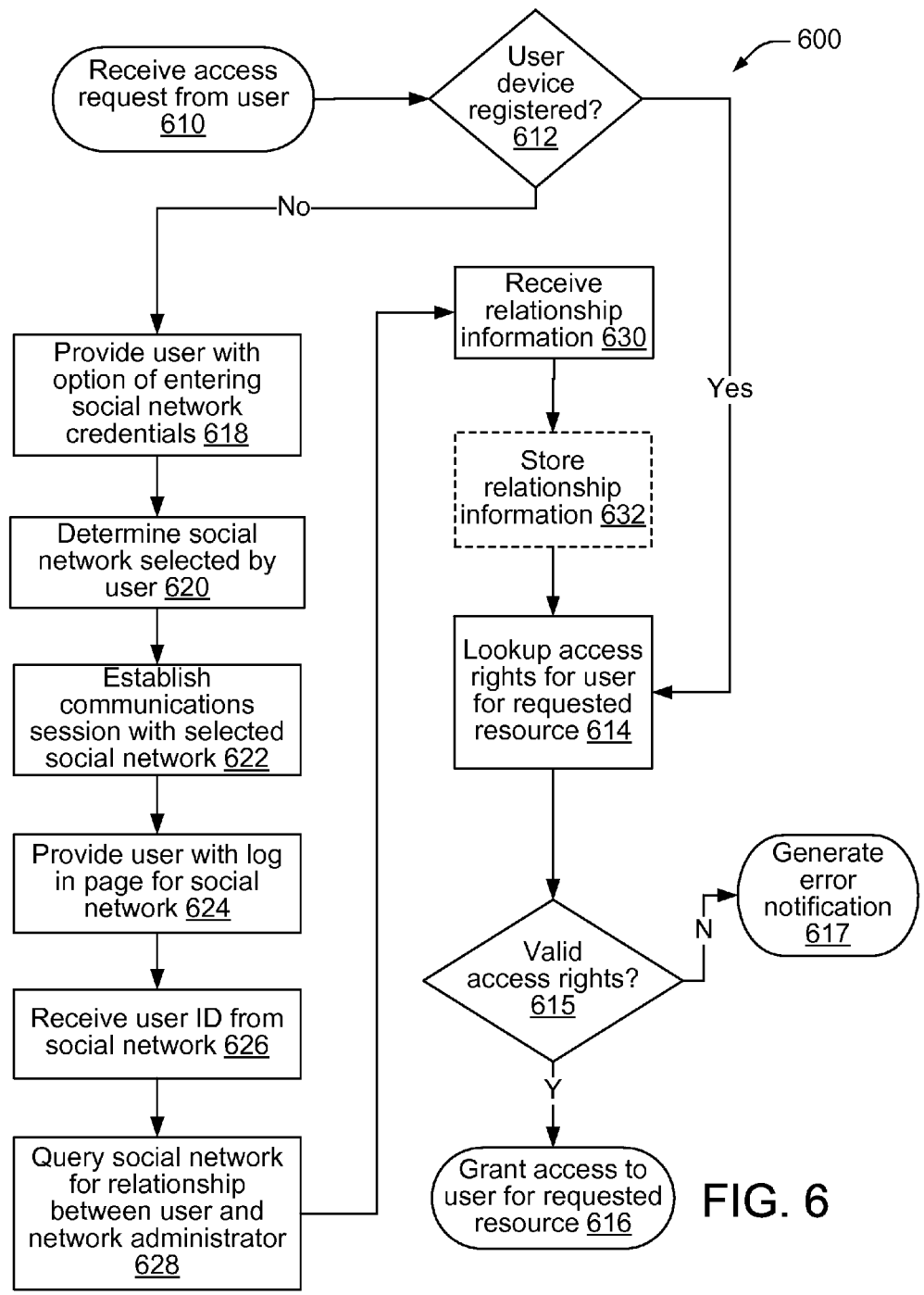
FIG. 6 is a flow chart illustrating an example of a process for granting access to network resources in a network using social networking information.

FIG. 6 is a flow chart illustrating an example of a process 600 for granting access to network resources in a network using social networking information. The process 600 may be performed by a network controller that verifies access to one or more resources in a network managed by the network controller, by checking the credentials of a network user requesting access using social network information provided by a network administrator and the network user. For example, the process 600 may be performed by the network controller 112 when the network administrator 116 connects to the LAN 110 and requests access to one or more network resources using the setup screens 310 and 320. The following describes the process 600 as being performed by components of the system 100. However, the process 600 may be performed by other systems or system configurations.

The process 600 is executed when the network controller receives an access request from the network user (610). For example, a computing device of the network user 116 may detect the wireless LAN 110 when within wireless reception range of the LAN 110, and automatically establish a connection with the LAN 110. The network user 116 may attempt to access the network resources in the LAN 110, e.g., the network user 116 may attempt to print to a printer in the LAN 110. The network controller 112 receives transmissions from the computing device of the network user 116 indicating that the network user 116 is attempting to access a particular resource on the LAN 110.

The network controller checks whether the user device is already registered (612). For example, based on the transmission received from the computing device of the network user 116 indicating that the network user 116 is attempting to access a particular resource on the LAN 110, the network controller 112 may check whether the computing device of the network user 116 is already registered. In one implementation, the network controller 112 performs the check by determining the MAC address of the computing device of the network user 116 from the transmissions received from the computing device of the network user 116. The network controller 112 checks in table 440 whether the determined MAC address of the computing device of the network user 116 is already present in the table 440. If there is a match with an existing MAC address in the table 440, the network controller 112 determines that the computing device of the network user 116 is already registered.

In the network controller determines that the user device is registered, the network controller looks up the access rights to the requested resource for the user associated with the user device (614). For example, based on determining that the MAC address of the computing device of the network user 116 is registered in table 440, the network controller 112 reads the corresponding row entry in the table 440 and determines whether the entry for the network user 116 is still valid by checking the "valid until" column 450. If the entry is valid, the network controller 112 checks whether the social network And groups corresponding to network user 116 as specified in columns 442 and 446 respectively in the row entry, are included in the allowed list of social networks and groups for the request network resource, as specified in table 420. If the network controller 112 determines that the social network And groups corresponding to network user 116 are included in the allowed list of social networks and groups for the request network resource, the network controller grants access to the user for the requested network resource (616). For example, the network controller 112 may allow a connection to be established between the computing device of the network user 116 and the requested network resource, and enable exchange of data between the computing device of the network user 116 and the requested network resource.

However, if the network controller 112 determines that the entry for the network user 116 in table 440 has expired, or that the social network or the groups corresponding to network user 116 are not included in the allowed list of social networks and groups for the request network resource, the network controller denies access to the user for the requested network resource and generates an error notification (617). The error notification may indicate that the request has been denied. In some implementations, the network controller 112 may present an option to the network user 116 to register with a supported social network, e.g., by using the registration screen 310.

On the other hand, upon checking whether the user device is registered, if the network controller determines that the user device is not registered, the network controller provides the user with an option of entering his/her credentials on a supported social network (618). For example, when the computing device of the network user 116 establishes a connection on the LAN 110, a notification may be presented on the computing device that it has to be registered on the LAN 110 before it can send/receive data or use any network resource. The network user 116 launches a web browser on the computing device in order to register, and the network controller 112 presents the registration screen 310 on the web browser. The network controller 112 presents a list of icons corresponding to the social networking services that are supported by the network controller 112 on the registration screen 310. The network user 116 selects a social networking service from the options displayed on registration screen 310, and the network controller determines the social network selected by the user (620). Upon determining the social network selected by the user, the network controller establishes a communications session with the selected social network (622). For example, the network controller 112 establishes a connection to a server hosting the selected social networking service, e.g., social network server 130.

When the connection is established, the server sends a log in page to the network controller 112. The network controller provides the user with the log in page for the selected social network (624). For example, the network controller 112 presents the registration screen 320 via a web browser on the computing device of network user 116, where the registration screen 320 is originated by the server hosting the social networking service selected by the network user 116.

Upon the network user 116 entering his/her credentials for the selected social networking service on the registration screen 320, the server hosting the selected social networking service accesses the associated account of network user 116 and verifies whether the account exists. If the account exists, the server sends to the network controller 112 the user identifier (user ID) associated with the account of the network user 116. The network controller receives the user ID from the social network (626) and then the network controller sends a query to the social network to determine the relationship between the network user and the network administrator (628). For example, the network controller 112 sends the user ID of the network user 116 to the API provided by the social networking service selected by the network user 116 to determine whether a relationship exists between the network user 116 and the network administrator 114, and also to determine which groups in the social graph of the network administrator 114 includes the network user 116.

The API returns to the network controller 112 verification whether a relationship exists, and the groups in the social graph of the network administrator 114 that include the network user 116. The network controller receives the relationship information (630) from the API. In some implementations, the network controller stores the relationship information (632) if a relationship exists between the network user and the network administrator. For example, the network controller 112 may store the information associated with the account of the network user 116 in the social networking service selected by the network user 116 if the API verifies a relationship exists between the network administrator 114 and the network user 116 in the social networking service selected by the network user 116. The network controller 112 stores the information in the table 440. The network controller 112 may store the information even if the social networking service selected by the network user 116, or the groups in the social graph of the network administrator 114 that include the network user 116, are not allowed to access the requested network resource. However, in some other implementations, the network controller 112 stores the information associated with the account of the network user 116 if the network controller 112 determines that the social networking service selected by the network user 116 and the groups in the social graph of the network administrator 114 that include the network user 116, are allowed to access the requested network resource.

The network controller uses the information provided by the API to look up the access rights for the network user for the requested resource (617), and decides to grant (616) or deny (617) access based on determining whether the access rights for the network user are valid for the requested network resource (615), as described earlier.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices;

magnetic disks, e.g., internal hard disks or removable disks; magneto optical disks; and CD ROM and DVD-ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for administering access to a network, the method comprising:
   receiving, at a network controller, an input from a network administrator associated with controlling a first network;
   in response to receiving the input, displaying, by the network controller, information corresponding to social networks supported by the network controller;
   receiving, from the network administrator, selection of a first social network from the displayed information, wherein the selection of the first social network includes information about an association between the network administrator and the first social network;
   establishing a communications session between the network controller and the first social network;
   receiving, from the first social network, user identification information associated with the network administrator in the first social network;
   receiving, from the network administrator, configuration parameters for resources in the first network; and
   configuring, based on the configuration parameters received from the network administrator and the user identification information associated with the network administrator received from the first social network, access to resources in the first network, wherein displaying a set of social networks supported by the network controller comprises:
- determining whether an association with a social network corresponding to the network administrator exists in the network controller;
- responsive to determining that an association with a social network corresponding to the network administrator does not exist in the network controller, providing the network administrator with an option to register an association with a social network from amongst the social networks supported by the network controller; and
- identifying the first social network based on a selection made by the network administrator in response to providing the option.

2. The method of claim 1, wherein receiving, from the network administrator, configuration parameters for resources in the first network include:
- determining information about a first group associated with the network administrator in the first social network based on receiving the user identification information associated with the network administrator in the first social network; and
- receiving information from the network administrator on configuring access to a first resource in the first network, wherein the information on configuring access includes instructions to allow access to the first resource to users included in the first group associated with the network administrator in the first social network.

3. The method of claim 2, further comprising:
- receiving, from a user, a request to access the first resource in the first network, wherein the request is generated by a user device;
- receiving, from the first social network, information corresponding to a relationship between the user and the network administrator in the first social network;
- determining, based on the information corresponding to the relationship received from the first social network and the configuration parameters for resources that are received from the network administrator, access rights of the user to the first resource in the first network, wherein the access rights of the user are associated with the user device; and
- responsive to determining access rights of the user to the first resource in the first network, allowing the user device to use the first resource in the first network.

4. The method of claim 3, wherein determining access rights of the user to the first resource comprises:
- determining whether the user is included in the first group associated with the network administrator in the first social network; and
- allowing the user to access the first resource in the first network based on determining that the user is included in the first group.

5. The method of claim 3, further comprising:
- responsive to receiving information associated with the relationship between the user and the network administrator in the first social network, storing information associated with user, wherein the information is stored in a database that is associated with the network controller.

6. The method of claim 5, wherein configuring, based on the configuration parameters received from the network administrator, access to resources in the first network comprises storing information associated with access rights to the resources in the first network in the database.

7. The method of claim 5, comprising:
- storing at least one of: information associated with the first social network, identification of the user, information associated with the relationship between the user and the network administrator in the first social network, identifying information associated with the user device, information associated with resources in the first network that the user is allowed to access, or a validity period associated with the access granted to the user.

8. The method of claim 7, wherein the identifying information associated with the user device includes a Medium Access Control (MAC) address of the user device.

9. The method of claim 7, the method comprising:
- storing information associated with a plurality of users in the first network;
- for each user in the plurality of users, querying the first social network for updates to information corresponding to the relationship between the respective user and the network administrator in the first social network;
- receiving from the social network, for each user in the plurality of users, updates to information corresponding to the relationship between the respective user and the network administrator in the first social network;
- determining, for each user in the plurality of users, whether access rights associated with respective user is valid based on updated information corresponding to the relationship between the respective user and the network in the first social network; and
- for each user in the plurality of users, responsive to determining that the access rights associated with respective user is no longer valid, deleting information associated with the respective user from the database.

10. The method of claim 1, wherein the communications session with the first social network is established using an application programming interface (API) provided by the first social network, and
- wherein information from the first social network is received using Open Authorization protocol version 2.0 (OAuth 2.0).

11. The method of claim 1, the method comprising:
- receiving, at the network controller, an input from a second network administrator for administering a second network controlled by the network controller, wherein the input from the second network administrator includes information about an association between the second network administrator and a second social network supported by the network controller;
- establishing a connection between the network controller and the second social network;
- receiving, from the second social network, user identification information associated with the second network administrator in the second social network;
- receiving, from the second network administrator, configuration parameters for resources in the second network; and
- configuring, based on the configuration parameters received from the network administrator and the user identification information associated with the second network administrator received from the second social network, access to resources in the second network.

12. The method of claim 11, wherein the first network and the second network are a same network.

13. The method of claim 11, wherein the first social network and the second social network are a same social network.

14. A system for administering access to a network, the system comprising:

a network controller comprising first instructions encoded in a non-transitory machine-readable medium that, when executed by a first processor, are configured to cause the first processor to perform operations including:
receiving, at the network controller, an input from a network administrator associated with controlling a first network;
in response to receiving the input, displaying, by the network controller, information corresponding to social networks supported by the network controller;
receiving, at the network controller and from the network administrator, selection of a first social network from the displayed information, wherein the selection of the first social network includes information about an association between the network administrator and the first social network;
establishing a communications session between the network controller and the first social network;
receiving, from the first social network, user identification information associated with the network administrator in the first social network;
receiving, from the network administrator, configuration parameters for resources in the first network; and
configuring, based on the configuration parameters received from the network administrator and the user identification information associated with the network administrator received from the first social network, access to resources in the network,
wherein displaying a set of social networks supported by the network controller comprises:
determining whether an association with a social network corresponding to the network administrator exists in the network controller;
responsive to determining that an association with a social network corresponding to the network administrator does not exist in the network controller, providing the network administrator with an option to register an association with a social network from amongst the social networks supported by the network controller; and
identifying the first social network based on a selection made by the network administrator in response to providing the option.

15. The system of claim 14, wherein the first instructions are configured to cause the first processor to perform operations including:
establishing the communications session with the first social network using an application programming interface (API) provided by the social network.

16. The system of claim 14, wherein the first instructions are configured to cause the first processor to perform operations including:
receiving information from the first social network using Open Authorization protocol version 2.0 (OAuth 2.0).

17. The system of claim 14, comprising:
a user device including second instructions encoded in a non-transitory machine-readable medium that, when executed by a second processor, are configured to cause the second processor to perform operations comprising:
sending a request to the network controller to access a first resource in the first network;
responsive to a query from the network controller, providing the network controller with information associated with a user of the user device in the first social network, wherein the information is provided by the user;
receiving permission from the network controller to access the first resource; and responsive to receiving permission from the network controller, using the first resource in the first network.

18. The system of claim 17, wherein the first instructions are configured to cause the first processor to perform operations including:
receiving, from the user device, a request to access the first resource in the first network;
receiving, from the first social network, information corresponding to a relationship between the user and the network administrator in the first social network;
determining, based on the information corresponding to the relationship received from the first social network and configuration parameters for resources that are received from the network administrator, access rights of the user to the first resource in the first network, wherein the access rights of the user are associated with the user device; and
responsive to determining access rights of the user to the first resource in the first network, allowing the user device to use the first resource in the first network.

19. A computer program product, implemented in a non-transitory machine-readable medium, the computer program product comprising instructions that, when executed by a processing device, cause the processing device to perform operations including:
receiving, at a network controller, an input from a network administrator associated with controlling a first network;
in response to receiving the input, displaying, by the network controller, information corresponding to social networks supported by the network controller;
receiving, from the network administrator, selection of a first social network from the displayed information, wherein the selection of the first social network includes information about an association between the network administrator and the first social network;
establishing a communications session between the network controller and the first social network;
receiving, from the first social network, user identification information associated with the network administrator in the first social network;
receiving, from the network administrator, configuration parameters for resources in the first network; and
configuring, based on the configuration parameters received from the network administrator and the user identification information associated with the network administrator received from the first social network, access to resources in the first network,
wherein displaying a set of social networks supported by the network controller comprises:
determining whether an association with a social network corresponding to the network administrator exists in the network controller;
responsive to determining that an association with a social network corresponding to the network administrator does not exist in the network controller, providing the network administrator with an option to register an association with a social network from amongst the social networks supported by the network controller; and
identifying the first social network based on a selection made by the network administrator in response to providing the option.

20. The computer program product of claim 19, wherein the instructions cause the processing device to perform operations including:
- receiving, from a user, a request to access a first resource in the first network, wherein the request is generated by the user using a user device;
- receiving, from the first social network, information corresponding to a relationship between the user and the network administrator in the first social network;
- determining, based on the information corresponding to the relationship received from the first social network and the configuration parameters for resources that are received from the network administrator, access rights of the user to the first resource in the first network, wherein the access rights of the user are associated with the user device; and
- responsive to determining access rights of the user to the first resource in the first network, allowing the user device to use the first resource in the first network.

21. The computer program product of claim 19, wherein the instructions cause the processing device to perform operations including:
- establishing the communications session with the first social network using an application programming interface (API) provided by the social network.

22. The computer program product of claim 19, wherein the instructions cause the processing device to perform operations including:
- receiving information from the first social network using Open Authorization protocol version 2.0 (OAuth 2.0).

* * * * *